US012348678B2

(12) United States Patent
Hu

(10) Patent No.: US 12,348,678 B2
(45) Date of Patent: Jul. 1, 2025

(54) SYSTEM AND METHOD FOR TRANSMITTING RICH MEDIA INFORMATION IN CALL PROCESS, AND DEVICE

(71) Applicant: Honor Device Co., Ltd., Shenzhen (CN)

(72) Inventor: Tenghui Hu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 404 days.

(21) Appl. No.: 17/926,756

(22) PCT Filed: Apr. 28, 2022

(86) PCT No.: PCT/CN2022/090005
§ 371 (c)(1),
(2) Date: Nov. 21, 2022

(87) PCT Pub. No.: WO2022/237566
PCT Pub. Date: Nov. 17, 2022

(65) Prior Publication Data
US 2023/0208980 A1    Jun. 29, 2023

(30) Foreign Application Priority Data
May 13, 2021    (CN) .......................... 202110521661.9

(51) Int. Cl.
*H04M 7/00*        (2006.01)
*H04L 65/1089*     (2022.01)
(Continued)

(52) U.S. Cl.
CPC ...... *H04M 7/0051* (2013.01); *H04L 65/1089* (2013.01); *H04L 65/65* (2022.05); *H04L 65/70* (2022.05); *H04M 1/72439* (2021.01)

(58) Field of Classification Search
CPC . H04M 7/0051; H04M 1/72439; H04L 65/70; H04L 65/65; H04L 65/1089
See application file for complete search history.

(56) References Cited

U.S. PATENT DOCUMENTS

2005/0265313 A1    12/2005   Poikselka
2007/0186005 A1    8/2007    Setlur et al.
(Continued)

FOREIGN PATENT DOCUMENTS

CN    101356791 A    1/2009
CN    102308566 A    1/2012
(Continued)

*Primary Examiner* — Duc C Ho
(74) *Attorney, Agent, or Firm* — Leydig, Voit & Mayer, Ltd.

(57) ABSTRACT

A method and device for transmitting rich media information in a call process are provided. A call connection is established between a first terminal and a second terminal. The first terminal determines, based on a user operation, target rich media information selected by a user in the first terminal, searches a first rich media library for a code corresponding to the target rich media information, encapsulates the code corresponding to the target rich media information into a real-time transport control protocol (RTCP) packet, and sends the RTCP packet to the second terminal. The second terminal parses the received RTCP packet to obtain a code in the RTCP packet, searches a second rich media library for rich media information corresponding to the code, and responds to the rich media information. Same rich media information corresponds to a same code in the first rich media library and the second rich media library.

18 Claims, 9 Drawing Sheets

(51) Int. Cl.
*H04L 65/65* (2022.01)
*H04L 65/70* (2022.01)
*H04M 1/72439* (2021.01)

(56) References Cited

U.S. PATENT DOCUMENTS

| | | |
|---|---|---|
| 2008/0107172 A1 | 5/2008 | Kwak |
| 2011/0113089 A1* | 5/2011 | Priyadarshan ............ G06F 8/60 709/203 |
| 2018/0302478 A1* | 10/2018 | Clediere ............... H04L 67/535 |
| 2020/0383008 A1 | 12/2020 | Mallikarjunan et al. |
| 2021/0084160 A1 | 3/2021 | Reddy et al. |

FOREIGN PATENT DOCUMENTS

| | | |
|---|---|---|
| CN | 106534203 A | 3/2017 |
| CN | 106921613 A | 7/2017 |
| CN | 108259510 A | 7/2018 |
| CN | 108513015 A | 9/2018 |
| CN | 113438200 A | 9/2021 |
| WO | 2007026237 A1 | 3/2007 |
| WO | 2007028137 A2 | 3/2007 |

* cited by examiner

SYSTEM AND METHOD FOR TRANSMITTING RICH MEDIA INFORMATION IN CALL PROCESS, AND DEVICE

CROSS-REFERENCE TO RELATED APPLICATIONS

This application is a national stage of International Application No. PCT/CN2022/090005, filed on Apr. 28, 2022, which claims priority to Chinese Patent Application No. 202110521661.9, filed on May 13, 2021. The disclosures of both of the aforementioned applications are hereby incorporated by reference in their entireties.

TECHNICAL FIELD

Embodiments of this application relate to the field of instant messaging technologies, and in particular, to a system and a method for transmitting rich media information in a call process, and a device.

BACKGROUND

With intelligentization of a call device, people express information in increasingly diversified manners. For example, currently, people may send rich media information such as an emoticon in a call process, to enrich fun in a call and bring better communication experience to the other party.

In an existing call process, rich media information is usually transferred between call devices by using a dual tone multi frequency (DTMF) signal. However, the DTMF signal and a voice signal are mutually exclusive. When the DTMF signal is sent between the call devices, a loss is inevitably caused to the voice signal, and consequently voice call experience is affected.

SUMMARY

Embodiments of this application provide a system and a method for transmitting rich media information in a call process, and a device, to resolve a technical problem that in a manner of transmitting rich media information in an existing call process, a voice signal is prone to be affected and consequently voice call experience is degraded.

According to a first aspect, an embodiment of this application provides a system for transmitting rich media information in a call process, including a first terminal and a second terminal. A call connection is established between the first terminal and the second terminal by using a real-time transport protocol (RTP) data link.

The first terminal is configured to: determine, based on a user operation, target rich media information selected by a user in the first terminal, search a first rich media library for a code corresponding to the target rich media information, encapsulate the code corresponding to the target rich media information into a real-time transport control protocol (RTCP) packet, and send an RTCP packet obtained after encapsulation to the second terminal.

The second terminal is configured to: parse the received RTCP packet to obtain a code in the RTCP packet, search a second rich media library for rich media information corresponding to the code in the RTCP packet, and respond to the found rich media information. Same rich media information corresponds to a same code in the first rich media library and the second rich media library.

In a feasible implementation, the first terminal is specifically configured to:
display at least one piece of rich media information in the first rich media library on a call interface of the first terminal when receiving a user operation of expanding a rich media information directory; and receive a selection operation, and determine rich media information selected based on the selection operation in the first rich media library as the target rich media information.

In a feasible implementation, the first terminal is specifically configured to:
display an input keyboard on a call interface of the first terminal when receiving a user operation of enabling key input; detect a first code entered by the user in the input keyboard; and determine whether there is the first code in the first rich media library, and if there is the first code in the first rich media library, determine rich media information corresponding to the first code in the first rich media library as the target rich media information.

In a feasible implementation, the first terminal is specifically configured to:
encapsulate the code corresponding to the target rich media information into a source description packet SDES field in the RTCP packet.

In a feasible implementation, the first terminal is specifically configured to:
configure a value string value string in the SDES field as the code corresponding to the target rich media information.

In a feasible implementation, the second terminal is specifically configured to:
parse the SDES field in the RTCP packet when receiving the RTCP packet sent by the first terminal, to obtain the code in the RTCP packet.

In a feasible implementation, the second terminal is specifically configured to:
parse the SDES field in the RTCP packet, and use a value string value string in the SDES field as the code in the RTCP packet.

In a feasible implementation, the second terminal is further specifically configured to:
if the second rich media library does not include the code in the RTCP packet and/or the rich media information corresponding to the code in the RTCP packet, obtain the rich media information corresponding to the code in the RTCP packet from the first terminal or a server connected to the second terminal, and respond to the obtained rich media information.

In a feasible implementation, the second terminal is further specifically configured to:
update the second rich media library based on the obtained rich media information corresponding to the code in the RTCP packet.

In a feasible implementation, the target rich media information includes any one of the following: an emoticon, a picture, an animation, a video, text, music, a link, and a vibration event.

In a feasible implementation, the second terminal is specifically configured to:
display or play the found rich media information on a call interface when the found rich media information is any one of an emoticon, a picture, an animation, a video, text, music, and a link; or trigger a vibration function when the found rich media information is a vibration event.

According to a second aspect, an embodiment of this application provides a method for transmitting rich media information in a call process. The method includes:

establishing, by a first terminal, a call connection to a second terminal by using a real-time transport protocol RTP data link;

determining, by the first terminal based on a user operation, target rich media information selected by a user in the first terminal;

searching, by the first terminal, a first rich media library for a code corresponding to the target rich media information; and encapsulating, by the first terminal, the found code corresponding to the target rich media information into a real-time transport control protocol RTCP packet, and sending an RTCP packet obtained after encapsulation to the second terminal. Same rich media information corresponds to a same code in the first rich media library and a second rich media library corresponding to the second terminal.

In a feasible implementation, the determining, by the first terminal based on a user operation, target rich media information selected by a user in the first terminal includes:

displaying, by the first terminal, at least one piece of rich media information in the first rich media library on a call interface of the first terminal when receiving a user operation of expanding a rich media information directory; and receiving, by the first terminal, a selection operation, and determining rich media information selected based on the selection operation in the first rich media library as the target rich media information.

In a feasible implementation, the determining, by the first terminal based on a user operation when receiving the preset user operation, target rich media information selected by a user in the first terminal includes:

displaying, by the first terminal, an input keyboard on a call interface of the first terminal when receiving a user operation of enabling key input; detecting a first code entered by the user in the input keyboard; and determining whether there is the first code in the first rich media library, and if there is the first code in the first rich media library, determining rich media information corresponding to the first code in the first rich media library as the target rich media information.

In a feasible implementation, the encapsulating, by the first terminal, the found code corresponding to the target rich media information into an RTCP packet includes:

encapsulating, by the first terminal, the found code corresponding to the target rich media information into a source description packet SDES field in the RTCP packet.

In a feasible implementation, the encapsulating, by the first terminal, the found code into an SDES field in the RTCP packet includes:

configuring, by the first terminal, a value string value string in the SDES field as the code corresponding to the target rich media information.

In a feasible implementation, the target rich media information includes any one of the following: an emoticon, a picture, an animation, a video, text, music, a link, and a vibration event.

According to a third aspect, an embodiment of this application provides a method for transmitting rich media information in a call process. The method includes:

establishing, by a second terminal, a call connection to a first terminal by using a real-time transport protocol RTP data link;

parsing, by the second terminal, an RTCP packet when receiving the real-time transport control protocol RTCP packet sent by the first terminal, to obtain a code in the RTCP packet; and searching, by the second terminal, a second rich media library for rich media information corresponding to the code, and responding to the found rich media information. Same rich media information corresponds to a same code in a first rich media library corresponding to the first terminal and the second rich media library.

In a feasible implementation, the parsing, by the second terminal, an RTCP packet when receiving the RTCP packet sent by the first terminal, to obtain a code in the RTCP packet includes:

parsing, by the second terminal, an SDES field in the RTCP packet when receiving the RTCP packet sent by the first terminal, to obtain the code in the RTCP packet.

In a feasible implementation, the parsing an SDES field in the RTCP packet, to obtain the code in the RTCP packet includes:

parsing the SDES field in the RTCP packet, and using a value string value string in the SDES field as the code in the RTCP packet.

In a feasible implementation, the searching, by the second terminal, a second rich media library corresponding to the second terminal for rich media information corresponding to the code, and responding to the found rich media information includes:

if the second rich media library does not include the code in the RTCP packet and/or the rich media information corresponding to the code in the RTCP packet, obtaining, by the second terminal, the rich media information corresponding to the code in the RTCP packet from the first terminal or a server connected to the second terminal, and responding to the obtained rich media information.

In a feasible implementation, after the obtaining, by the second terminal, the rich media information corresponding to the code in the RTCP packet from the first terminal or a server connected to the second terminal, the method further includes:

updating, by the second terminal, the second rich media library based on the obtained rich media information corresponding to the code in the RTCP packet.

In a feasible implementation, the searching a second rich media library for rich media information corresponding to the code in the RTCP packet, and responding to the found rich media information includes:

displaying or playing the found rich media information on a call interface of the second terminal when the found rich media information is any one of an emoticon, a picture, an animation, a video, text, music, and a link; or triggering a vibration function of the second terminal when the found rich media information is a vibration event.

According to a fourth aspect, an embodiment of this application provides an apparatus for transmitting rich media information in a call process. The apparatus is applied to a first terminal, and includes:

a communications module, configured to establish a call connection to a second terminal by using an RTP data link;

a sensing module, configured to determine, based on a user operation, target rich media information selected by a user in the first terminal;

a searching module, configured to search a first rich media library for a code corresponding to the target rich media information; and a processing module, configured to: encapsulate the found code corresponding to the target rich media information into an RTCP packet, and send an RTCP packet obtained after encapsulation to the second terminal. Same rich media information corresponds to a same code in the first rich media library and a second rich media library corresponding to the second terminal.

In a feasible implementation, the sensing module is specifically configured to:

display at least one piece of rich media information in the first rich media library on a call interface of the first terminal when receiving a user operation of expanding a rich media information directory; and receive a selection operation, and determine rich media information selected based on the selection operation in the first rich media library as the target rich media information.

In a feasible implementation, the sensing module is specifically configured to:

display an input keyboard on a call interface of the first terminal when receiving a user operation of enabling key input; detect a first code entered by the user in the input keyboard; and determine whether there is the first code in the first rich media library, and if there is the first code in the first rich media library, determine rich media information corresponding to the first code in the first rich media library as the target rich media information.

In a feasible implementation, the processing module is specifically configured to:

encapsulate the found code corresponding to the target rich media information into a source description packet SDES field in the RTCP packet.

In a feasible implementation, the processing module is specifically configured to:

configure a value string value string in the SDES field as the code corresponding to the target rich media information.

In a feasible implementation, the target rich media information includes any one of the following: an emoticon, a picture, an animation, a video, text, music, a link, and a vibration event.

According to a fifth aspect, an embodiment of this application provides an apparatus for transmitting rich media information in a call process. The apparatus is applied to a second terminal, and includes:

a communications module, configured to establish a call connection to a first terminal by using an RTP data link;

a parsing module, configured to parse an RTCP packet when receiving the RTCP packet sent by the first terminal, to obtain a code in the RTCP packet; and a processing module, configured to: search a second rich media library for rich media information corresponding to the code, and respond to the found rich media information. Same rich media information corresponds to a same code in a first rich media library corresponding to the first terminal and the second rich media library.

In a feasible implementation, the parsing module is specifically configured to:

parse an SDES field in the RTCP packet when receiving the RTCP packet sent by the first terminal, to obtain the code in the RTCP packet.

In a feasible implementation, the parsing module is specifically configured to:

parse the SDES field in the RTCP packet, and use a value string value string in the SDES field as the code in the RTCP packet.

In a feasible implementation, the processing module is further specifically configured to:

if the second rich media library does not include the code in the RTCP packet and/or the rich media information corresponding to the code in the RTCP packet, obtain, by the second terminal, the rich media information corresponding to the code in the RTCP packet from the first terminal or a server connected to the second terminal, and respond to the obtained rich media information.

In a feasible implementation, the parsing module is further specifically configured to:

update the second rich media library based on the obtained rich media information corresponding to the code in the RTCP packet.

In a feasible implementation, the parsing module is specifically configured to:

display or play the found rich media information on a call interface of the second terminal when the found rich media information is any one of an emoticon, a picture, an animation, a video, text, music, and a link; or trigger a vibration function of the second terminal when the found rich media information is a vibration event.

According to a sixth aspect, an embodiment of this application provides a terminal device, including at least one processor and a memory.

The memory stores computer-executable instructions.

The at least one processor executes the computer-executable instructions stored in the memory, so that the at least one processor performs the steps in the method for transmitting rich media information in a call process provided in the first aspect.

According to a seventh aspect, an embodiment of this application provides a terminal device, including at least one processor and a memory.

The memory stores computer-executable instructions.

The at least one processor executes the computer-executable instructions stored in the memory, so that the at least one processor performs the steps in the method for transmitting rich media information in a call process provided in the second aspect.

According to an eighth aspect, an embodiment of this application provides a computer-readable storage medium. The computer-readable storage medium stores computer-executable instructions, and when a processor executes the computer-executable instructions, the steps in the method for transmitting rich media information in a call process provided in the first aspect or the second aspect are implemented.

According to a ninth aspect, an embodiment of this application provides a computer program product, including a computer program. When the computer program is executed by a processor, the steps in the method for transmitting rich media information in a call process provided in the first aspect or the second aspect are implemented.

According to the system and the method for transmitting rich media information in a call process, and the device provided in the embodiments of this application, when the first terminal and the second terminal are in a call state, if the user of the first terminal wants to send rich media information to the second terminal, the first terminal may encapsulate a code corresponding to the rich media information into an RTCP packet, and send the code to the second terminal by using the RTCP packet as a carrier; and the second terminal parses the received RTCP packet to obtain the code, and then may invoke, from the rich media library corresponding to the second terminal, the same rich media information that the user of the first terminal wants to send, and respond to the rich media information. After the call connection is established between the first terminal and the second terminal by using the RTP data link, a voice stream or a video stream is transmitted by using the RTP data link. The RTCP packet is originally used to carry channel quality information of the RTP data link of the first terminal, and does not affect the voice stream or the video stream transmitted in the RTP data link. Therefore, in the manner of encapsulating the code corresponding to the rich media information into the RTCP packet and transmitting the code by using the RTCP packet as a carrier, a case in which when the call terminal transmits the code corresponding to the rich media information, a loss is caused to the voice stream or the video stream that is being transmitted may be effectively avoided. In this way, fun in a call process can be enriched, and no impact is exerted on voice call experience.

BRIEF DESCRIPTION OF DRAWINGS

To describe the technical solutions in the embodiments of this application or in the conventional technology more clearly, the following briefly describes the accompanying drawings required for describing the embodiments of this application or the conventional technology. Apparently, the accompanying drawings in the following description are merely some embodiments of this application, and a person of ordinary skill in the art may further derive other drawings from these accompanying drawings without creative efforts.

DESCRIPTION OF EMBODIMENTS

To make the objectives, technical solutions, and advantages of the embodiments of this application more clearly, the following clearly and comprehensively describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application. In addition, although the disclosure in this application is described based on one or more examples, it should be understood that each aspect of the disclosure may separately constitute a complete implementation.

It should be noted that brief description of terms in this application is merely intended to facilitate understanding of the implementations described below, and is not intended to limit the implementations of this application. Unless otherwise specified, these terms should be understood based on their ordinary meanings.

The terms "first", "second", and the like in the specification, claims, and accompanying drawings of this application are used to distinguish between similar or same objects or entities, and do not necessarily indicate a specific order or sequence, unless otherwise noted. It should be understood that the terms used in this manner are interchangeable at appropriate cases, for example, can be implemented in an order other than those given in the illustrations or descriptions of the embodiments of this application.

In addition, the terms "comprise", "include", and any other variant thereof are intended to cover non-exclusive inclusion. For example, a product or a device that includes a series of components is not necessarily limited to the components that are expressly listed, and may include another component that is not expressly listed or inherent to the product or the device.

The term "module" used in this application refers to a combination of any known or later developed hardware, software, firmware, artificial intelligence, fuzzy logic, or hardware or/and software code, and can perform a function related to the element.

Figure 1:
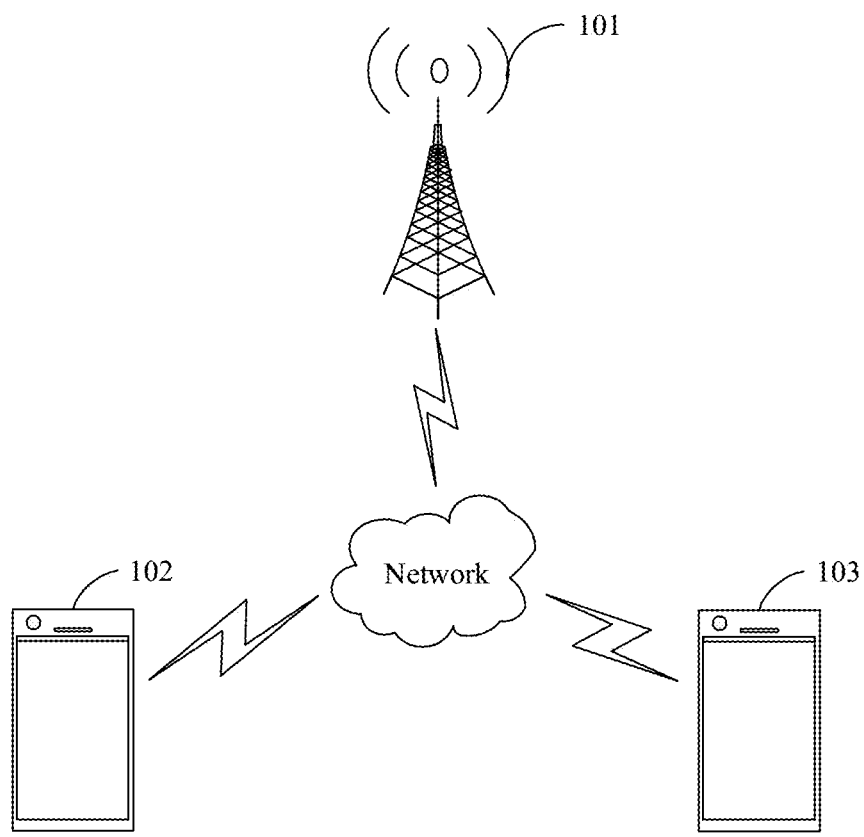
FIG. 1 is a schematic architectural diagram of a call system according to an embodiment of this application.

FIG. 1 is a schematic architectural diagram of a call system according to an embodiment of this application. In the communications system shown in FIG. 1, description is provided by using an example in which the communications system includes one network device 110 and two terminal devices (a first terminal 121 and a second terminal 122). It may be understood that the communications system may include a plurality of network devices, and another quantity of terminal devices may be included in a coverage area of each network device. This is not limited in this embodiment of this application.

The communications system may be a long term evolution (LTE) system, an LTE frequency division duplex (FDD) system, an LTE time division duplex (TDD) system, an advanced long term evolution (LTE-A) system, a new radio (NR) system, an evolved system of the NR system, an LTE-based access to unlicensed spectrum (LTE-U) system, an NR-based access to unlicensed spectrum (NR-U) system, a worldwide interoperability for microwave access (WiMAX) communications system, a wireless local area network (WLAN), wireless fidelity (WiFi), a next-generation communications system, another communications system, or the like. The NR system may also be referred to as a 5G system or a 5G network.

The network device 110 may provide communication coverage for a specific geographic area, and may communicate with a terminal device located in the coverage area.

Optionally, the network device 110 may be an evolved NodeB (Evolutional Node B, or eNB, or eNodeB) in the LTE system or a wireless controller in a cloud radio access network (CRAN). Alternatively, the network device 110 may be a mobile switching center, a relay station, an access point, a vehicle-mounted device, a wearable device, a hub, a switch, a bridge, a router, a network-side device in the 5G network, a network device in a future evolved public land mobile network (PLMN), or the like.

When the communications system is the NR system, the network device 110 may be a (radio) access network (RAN) device in the NR system. The RAN device in the NR system may be an access point (AP) or a next-generation base station (which may be collectively referred to as a next-generation radio access network node (NG-RAN node)) in a non-3GPP access network such as a Wi-Fi network. The next-generation base station includes a new radio NodeB (NR nodeB, gNB), a next-generation evolved NodeB (NG-eNB), a centralized unit (central unit, or CU), a distributed unit (DU), a gNB in a discrete form, a new radio controller (NR controller), a remote radio unit, a micro base station, a relay, a transmission/reception point (TRP), a transmission point (TP), or another node.

A specific technology and a specific device form used for the network device are not limited in this embodiment of this application. For ease of description, in all the embodiments of this application, the foregoing apparatuses that provide a wireless communication function for the terminal device are collectively referred to as the network device.

In this embodiment of this application, the terminal device may be any terminal, for example, may be user equipment for machine-type communication, and may be referred to as a user equipment (UE), a mobile station (MS), a mobile terminal, a terminal, or the like.

The terminal device may communicate with one or more core networks by using a RAN. Therefore, the terminal device may also be referred to as a wireless terminal. The wireless terminal may refer to a device that provides voice and/or data connectivity for a user, a handheld device with a wireless connection function, or another processing device connected to a wireless modem.

For example, the terminal device may be a cellular phone, a cordless phone, a session initiation protocol (SIP) telephone, a wireless local loop (WLL) station, a personal digital assistant (PDA), a handheld device with a wireless communication function, a computing device, another processing device connected to a wireless modem, a vehicle-mounted device, or a wearable device, or may be a virtual reality (VR) terminal device, an augmented reality (AR) terminal device, a wireless terminal in industrial control, a wireless terminal in self-driving, a wireless terminal in telemedicine, a wireless terminal in a smart city, a wireless terminal in a smart home, or the like. This is not specifically limited in this embodiment of this application.

Optionally, communication between the network device 110 and the terminal device and communication between the two terminal devices may be performed by using a licensed spectrum, may be performed by using an unlicensed spectrum, or may be performed by using both a licensed spectrum and an unlicensed spectrum. A spectrum resource used between the network device 110 and the terminal device is not limited in this embodiment of this application.

As a basic service in communication, a voice call needs to be supported in various wireless networks. For example, in a global system for mobile communications (GSM) and a universal mobile telecommunications system (UMTS), the voice call is implemented in a circuit switched (CS) domain; and in an LTE system and a fifth-generation (5G) communications system, the voice call, namely, voice over internet protocol (IP) (VoIP), is implemented in a packet switched (PS) domain.

In the LTE system, the terminal device implements the voice call in the PS domain based on an IP multimedia subsystem (IMS). The voice call may also be referred to as voice over LTE (VoLTE). The terminal device accesses an eNB in an evolved universal terrestrial radio access network (E-UTRAN) through an air interface link, and then is connected to a mobility management entity (MME) in the core network. A path of user plane data of the terminal device is connected to a serving gateway (S-GW) and/or a packet data network gateway (P-GW) in the core network through the eNB, and then accesses an IMS through the P-GW. The terminal device completes a basic data service connection to the MME in the PS domain, then performs a SIP-based access process to the IMS, and establishes the voice call in the PS domain with a remote terminal device through an IMS device.

Similarly, in the 5G system, the terminal device accesses a gNB through an air interface link, and then is connected to an access and mobility management function (AMF) and a session management function (SMF) in the core network. A path of user plane data of the terminal device is connected to a user plane function (UPF) in the core network through the gNB, and then accesses an IMS.

In addition, in the LTE system, similar to VoLTE, a video over LTE (ViLTE), VoWi-Fi, and the like may be established between terminal devices. Details are not described in this application.

Figure 2:
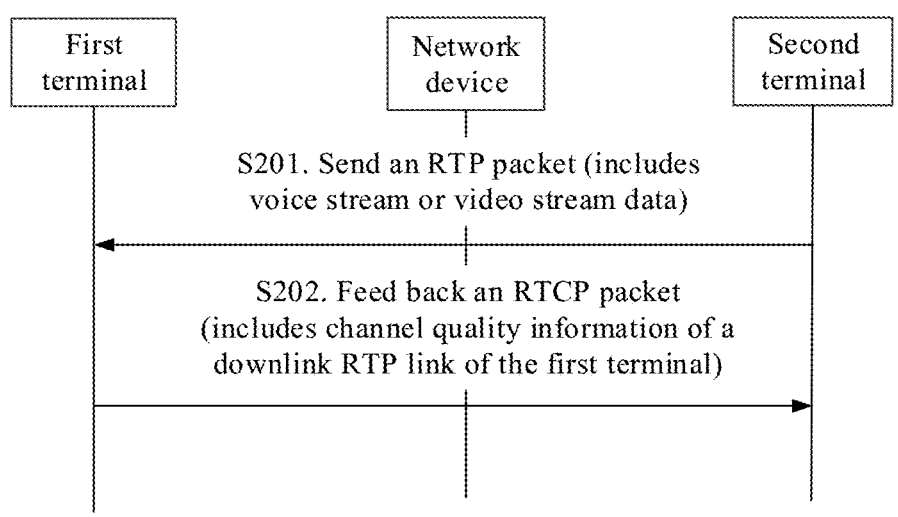
FIG. 2 is a schematic diagram of a signaling procedure of a call process according to an embodiment of this application.

In some embodiments, when two terminal devices establish a call in the PS domain, an RTP data link may be established based on a real-time RTP, to transmit a voice stream or a video stream. FIG. 2 is a schematic diagram of a signaling procedure of a call process according to an embodiment of this application. In this embodiment of this application, the call process includes the following steps.

S201. A second terminal sends an RTP packet to a first terminal through a network device, where the RTP packet includes voice stream or video stream data of the second terminal in the call process.

S202. The first terminal feeds back an RTCP packet to the second terminal through the network device, where the RTCP packet includes channel quality information of a downlink RTP data link of the first terminal.

Optionally, the first terminal may be a call initiator, and the second terminal is a call receiver; or the first terminal is a call receiver, and the second terminal is a call initiator. That is, the first terminal may send an RTP packet to the second terminal through the network device, where the RTP packet includes voice stream or video stream data of the first terminal in the call process, and after receiving the RTP packet sent by the first terminal, the second terminal feeds back an RTCP packet to the first terminal through the network device, where the RTCP packet includes channel quality information of a downlink RTP link of the second terminal.

An RTCP may provide session quality or broadcast performance quality information for an application program. The information includes a quantity of information packets that are sent, a quantity of lost information packets, jitter of the information packet, and the like, and the feedback information may reflect a network status in the current call process.

In some embodiments, after a call connection is established between the first terminal and the second terminal, if the first terminal receives an operation of sending, by a user, rich media information to the second terminal, the first terminal usually sends a file code corresponding to the rich media information to the second terminal by using a DTMF signal as a carrier; and after receiving the DTMF signal sent by the first terminal, the second terminal may invoke, based on the file code included in the DTMF signal, the corresponding rich media information from a rich media library corresponding to the second terminal, and play the corresponding rich media information. However, the DTMF signal and a voice signal are mutually exclusive. When the DTMF signal is sent between the first terminal and the second terminal, a loss is inevitably caused to the voice signal, and consequently voice call experience is affected.

To resolve the foregoing technical problem, an embodiment of this application provides a system for transmitting rich media information in a call process. In the system, after a call connection is established between a first terminal and a second terminal, if the first terminal receives an operation of sending, by a user, rich media information to the second terminal, the first terminal sends a code corresponding to the rich media information to the second terminal by using an RTCP packet as a carrier. The RTCP packet is originally used to carry channel quality information of an RTP data link of the first terminal, and does not affect a voice stream or a video stream transmitted in the RTP data link. Therefore, in the manner of transmitting the code by using the RTCP packet as a carrier, a case in which when the first terminal transmits the code corresponding to the rich media information, a loss is caused to the voice stream or the video stream that is being transmitted may be effectively avoided. In this way, fun in a call process can be enriched, and no impact is exerted on voice call experience.

For details, refer to the following embodiments of this application.

Figure 3:
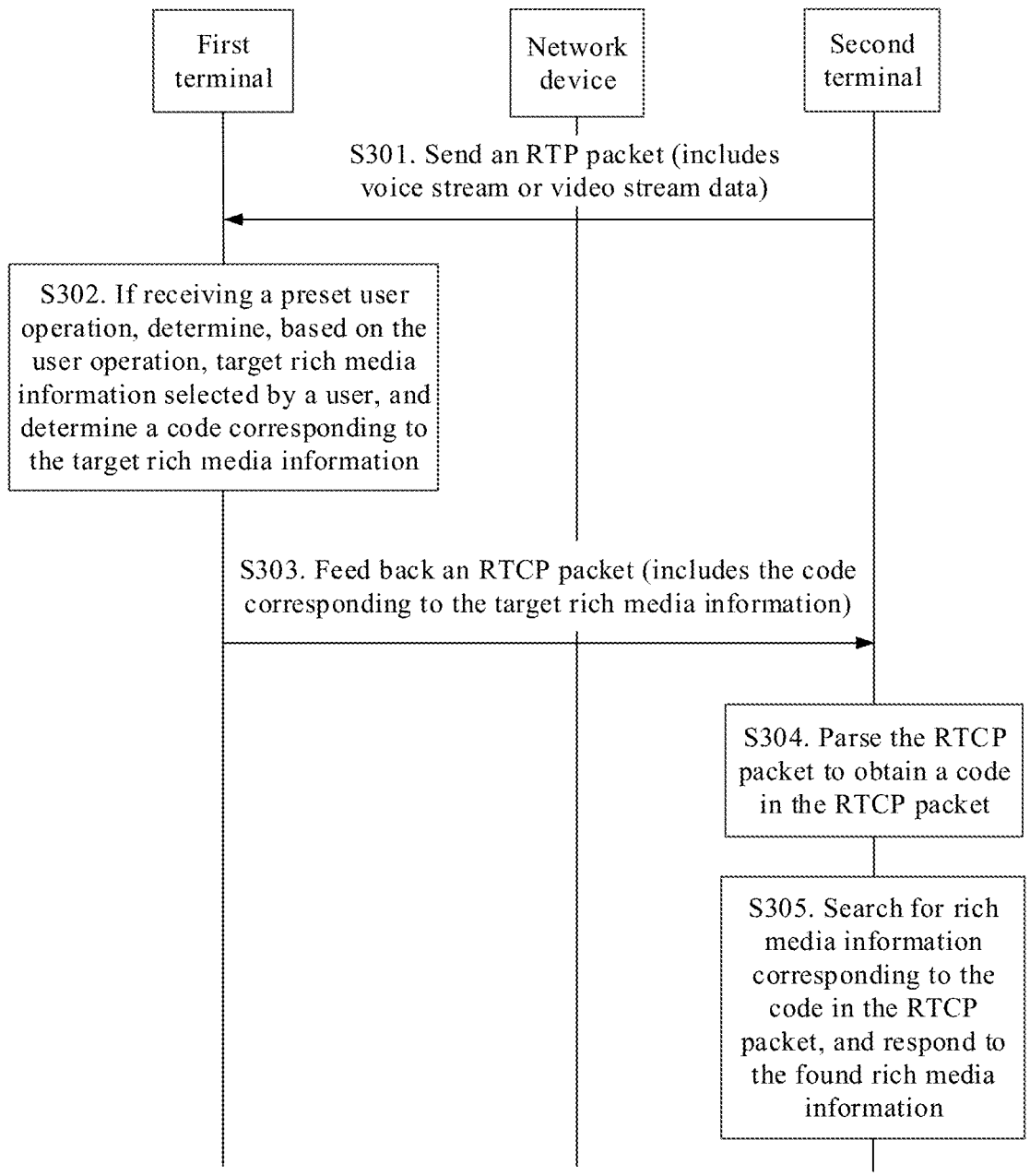
FIG. 3 is a schematic flowchart of steps in a method for transmitting rich media information in a call process according to an embodiment of this application.

FIG. 3 is a schematic flowchart of steps in a method for transmitting rich media information in a call process according to an embodiment of this application. In a feasible embodiment of this application, the call method includes the following steps.

S301. A second terminal sends an RTP packet to a first terminal through a network device, where the RTP packet includes voice stream or video stream data in a call process.

In this embodiment of this application, after the first terminal and the second terminal establish a voice call or a video call in a PS domain, the second terminal sends the RTP packet to the first terminal through the network device, to transmit a voice stream or a video stream.

S302. If receiving a preset user operation, the first terminal determines, based on the user operation, target rich media information selected by a user, and determines a code corresponding to the target rich media information.

In a feasible implementation, after the first terminal and the second terminal establish the voice call or the video call in the PS domain, if the user of the first terminal wants to interact with a user of the second terminal, the user of the first terminal may perform a related user operation on a call interface of the first terminal. Optionally, the user operation includes sending rich media information, a vibration event, and the like in a first rich media library preset in the first terminal. For example, when wanting to communicate a happy emotion to the user of the second terminal, the user of the first terminal may select an emoticon "happy" in the first rich media library, and trigger a sending instruction.

When determining, based on the user operation, the target rich media information selected by the user in the first rich media library, the first terminal searches the first rich media library for the code corresponding to the target rich media information. For example, when receiving an operation of sending, by the user, an emoticon "happy", the first terminal searches the first rich media library for a code corresponding to the emoticon "happy".

It should be understood that a rich media library is preset in each of the first terminal and the second terminal in this embodiment of this application. The rich media library stores a plurality of types of rich media information, a code corresponding to each piece of rich media information, a plurality of events, and a code corresponding to each event.

Optionally, the rich media information may include an emoticon, a picture, an animation, a video, text, music, a link, and the like. The event includes "vibration" and the like. This is not limited in this embodiment of this application. Any information or event that can be transmitted in a call process falls within the protection scope of this application.

In addition, formats of various types of rich media information are not limited in this embodiment of this application. For example, the emoticon may be in a format of JPG, CFC, EIP, EIF, BMP, or GIF.

Each piece of rich media information and each event correspond to one code. For a better understanding of this embodiment of this application, refer to Table 1.

TABLE 1

| Type | File | Code |
| --- | --- | --- |
| Emoticon | Smiling.JPG | 11 |
|  | Sad.JPG | 12 |
| Picture | Picture.JPG | 21 |
| Animation | Funny animation.rmvb | 31 |
|  | Hitting animation.rmvb | 32 |
| Video | Video 1.MPEG | 41 |
|  | Video 2.MPEG | 42 |
| Text | Document 1.TXT | 51 |
|  | Document 1.TXT | 52 |
| Music | Applauding.MP3 | 61 |
|  | Laughing.MP3 | 62 |
| Link | Toy store.html | 71 |
| Vibration | — | 81 |

There is a same code for same rich media information or a same event in rich media libraries corresponding to the first terminal and the second terminal.

S303. The first terminal encapsulates the code corresponding to the target rich media information into an RTCP packet, and feeds back the RTCP packet to the second terminal through the network device.

After an RTP data link is established between the first terminal and the second terminal, the first terminal and the second terminal periodically send the RTCP packet to each other.

In this embodiment of this application, after finding the code corresponding to the target rich media information in the first rich media library, the first terminal may encapsulate the code into the RTCP packet that needs to be sent to the second terminal recently.

S304. The second terminal parses the received RTCP packet to obtain a code in the RTCP packet.

In this embodiment of this application, after receiving the RTCP packet sent by the first terminal, the second terminal parses the RTCP packet to obtain the code included in the RTCP packet. The code is the code corresponding to the target rich media information sent by the first terminal.

S305. The second terminal searches for rich media information corresponding to the code in the RTCP packet, and responds to the found rich media information.

In this embodiment of this application, after obtaining the code in the RTCP packet through parsing, the second terminal may search a second rich media library preset in the second terminal for the rich media information corresponding to the code, and respond to the rich media information.

It may be understood that there is a same code for same rich media information in the first terminal and the second terminal, and therefore the rich media information found by the second terminal needs is inevitably the same as the rich media information selected by the user of the first terminal in the first terminal. In other words, that the second terminal responds to the currently found rich media information is equivalent to responding to the user operation triggered by the user of the first terminal in the first terminal.

For example, when the user operation received by the first terminal is sending an emoticon "smiling", the first terminal first determines, by searching the first rich media library preset in the first terminal, that a code of the emoticon "smiling" is "11", then encapsulates the code "11" into the RTCP packet, and sends the RTCP packet to the second terminal. After receiving the RTCP packet sent by the first terminal, the second terminal parses the RTCP packet to obtain the code "11" included in the RTCP packet. In this case, the second terminal may determine, by searching the second rich media library preset in the second terminal, that rich media information corresponding to the code "11" is the emoticon "smiling", and display the emoticon "smiling" on a current call interface, to implement interaction between the user of the first terminal and the user of the second terminal.

It may be understood that a same code corresponds to same rich media information in the first terminal and the second terminal, and therefore after the second terminal determines the code sent by the first terminal, the second terminal may directly invoke the corresponding rich media information from the second rich media library in the second terminal, and play the corresponding rich media information, and does not need to obtain or download the rich media information from the first terminal or another server. In this way, network transmission resources are saved, and the second terminal can more quickly present the rich media information to the user. This is more suitable for an application scenario, for example, a voice call, with a relatively high real-time requirement.

In some other embodiments, after the second terminal determines the code sent by the first terminal, if the second rich media library in the second terminal does not store the corresponding rich media information, the second terminal may obtain the rich media information corresponding to the code from the first terminal or the server based on the code, and play the rich media information.

Optionally, after obtaining the rich media information corresponding to the code from the first terminal or the server, the second terminal may further store the rich media information in the rich media library in the second terminal, so that in a subsequent call process, the second terminal may directly invoke the rich media information from the rich media library in the second terminal, and play the rich media information, and does not need to repeatedly obtain the rich media information from the first terminal or the server. In this way, network transmission resources can be saved, and a real-time requirement of a voice call can be met.

It should be noted that after the first terminal and the second terminal establish the voice call or the video call in the PS domain, after receiving a preset user operation, the second terminal may determine, based on the user operation, target rich media information selected by the user in the second terminal, search the second rich media library for a code corresponding to the target rich media information, encapsulate the code corresponding to the target rich media information into a real-time transport control protocol RTCP packet, and send the RTCP packet to the first terminal; and the first terminal parses the received RTCP packet to obtain a code, and then may search the first rich media library for rich media information corresponding to the code in the RTCP packet, and respond to the rich media information. In other words, after the first terminal and the second terminal establish the voice call or the video call in the PS domain, the first terminal and the second terminal may send the rich media information to each other, so that there are increasingly diversified and personalized manners of expression for the user in the call process, to enrich fun in a call and better assist the user in fully expressing an emotion.

According to the method for transmitting rich media information in a call process provided in this embodiment of this application, after a call connection is established between the first terminal and the second terminal by using the RTP data link, a voice stream or a video stream is transmitted by using the RTP data link. The RTCP packet is originally used to carry channel quality information of an RTP data link of the first terminal, and does not affect the voice stream or the video stream transmitted in the RTP data link. Therefore, in the manner of encapsulating the code corresponding to the rich media information into the RTCP packet and transmitting the code by using the RTCP packet as a carrier, a case in which when the call terminal transmits the code corresponding to the rich media information, a loss is caused to the voice stream or the video stream that is being transmitted may be effectively avoided. In this way, fun in a call process can be enriched, and no impact is exerted on voice call experience.

Based on the content described in the foregoing embodiment, in a feasible implementation of this application, RTCP packets may be classified into five types based on different carried control information: RR (receiver report packet), SR (source report packet), SEDS (source description packet), BYE (reason for leaving), and APP (special application packet).

Figure 4:
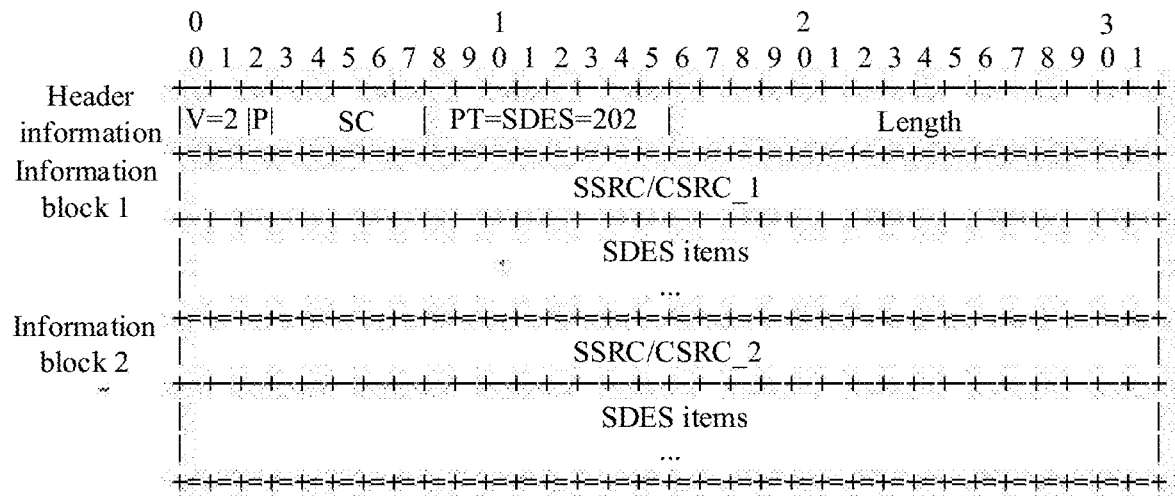
FIG. 4 is a schematic diagram of an encapsulation structure of an RTCP packet according to an embodiment of this application.

To better understand this embodiment of this application, FIG. 4 is a schematic diagram of an encapsulation structure of an RTCP packet according to an embodiment of this application.

Header information of the RTCP packet includes the following content:

Version number V: V=2, and this indicates that a version number of an RTP in a current version is 2.

Padding P: This is a padding bit, and indicates that the packet is padded to exceed a natural size of the packet.

Source count SC: This includes a total of 5 bits, and indicates a quantity of SSRC/CSRC blocks included in the SDES packet.

Packet type PT: This indicates a type of information carried in the data packet.

Length: This is a length field, and indicates a length of packet content after a common header.

In a feasible implementation, the code corresponding to the target rich media information described in the foregoing embodiment may be encapsulated into a PRIV category in an SDES field.

PRIV is used to define an experimental or application-specific SDES extension. PRTV includes a prefix that includes a long string pair and a value string that is used for padding another part of the item and that carries required information.

Figure 5:
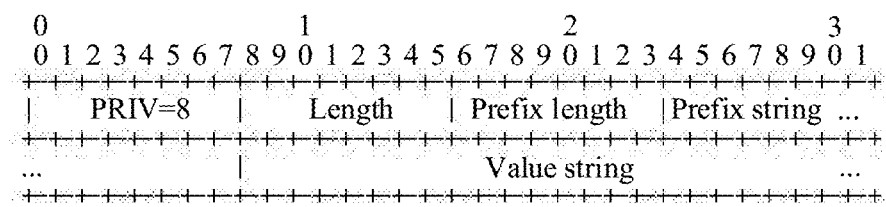
FIG. 5 is a schematic diagram of an encapsulation structure of SDES according to an embodiment of this application.

To better understand this embodiment of this application, FIG. 5 is a schematic diagram of an encapsulation structure of SDES according to an embodiment of this application.

Herein, prefix length represents a prefix length, and usually includes 8 bits; prefix string represents a prefix string, is a name selected by a person who defines a PRIV item, and uniquely corresponds to another PRIV item received by an application; and value string represents a value string. In this embodiment of this application, the value string "value string" may be used to represent the code corresponding to the target rich media information described in the foregoing embodiment.

For example, after finding that the code corresponding to the target rich media information in the first rich media library is "11", the first terminal may set the value string in the SDES field in the RTCP packet to "11," and then send the set RTCP packet to the second terminal. After receiving the RTCP packet sent by the first terminal, the second terminal may determine, by parsing the value string in the SDES field in the RTCP packet, that the code encapsulated into the RTCP packet is "11".

It may be understood that in comparison with a manner of transmitting the code based on an RTP packet, in the manner of transmitting the code based on the RTCP packet in this embodiment of this application, bandwidth load of a channel for transmitting the voice stream or the video stream is not increased, and in a network congestion scenario, no impact is exerted on basic voice call experience, and a compatibility problem on a media gateway side in a core network can be avoided.

Based on the content described in the foregoing embodiment, in a feasible implementation of this application, after the call connection is established between the first terminal and the second terminal by using the RTP data link, if receiving a user operation of expanding a rich media information directory, the first terminal displays at least one piece of rich media information in the first rich media library on the call interface of the first terminal, and when receiving a selection operation, determines rich media information selected based on the selection operation in the first rich media library as the target rich media information. Then, the first terminal searches the first rich media library for the code corresponding to the target rich media information, encapsulates the code corresponding to the target rich media information into the RTCP packet, and sends the RTCP packet to the second terminal.

After receiving the RTCP packet sent by the first terminal, the second terminal parses the received RTCP packet to obtain the code in the RTCP packet, searches the second rich media library for the rich media information corresponding to the code in the RTCP packet, and responds to the found rich media information.

Figure 6:
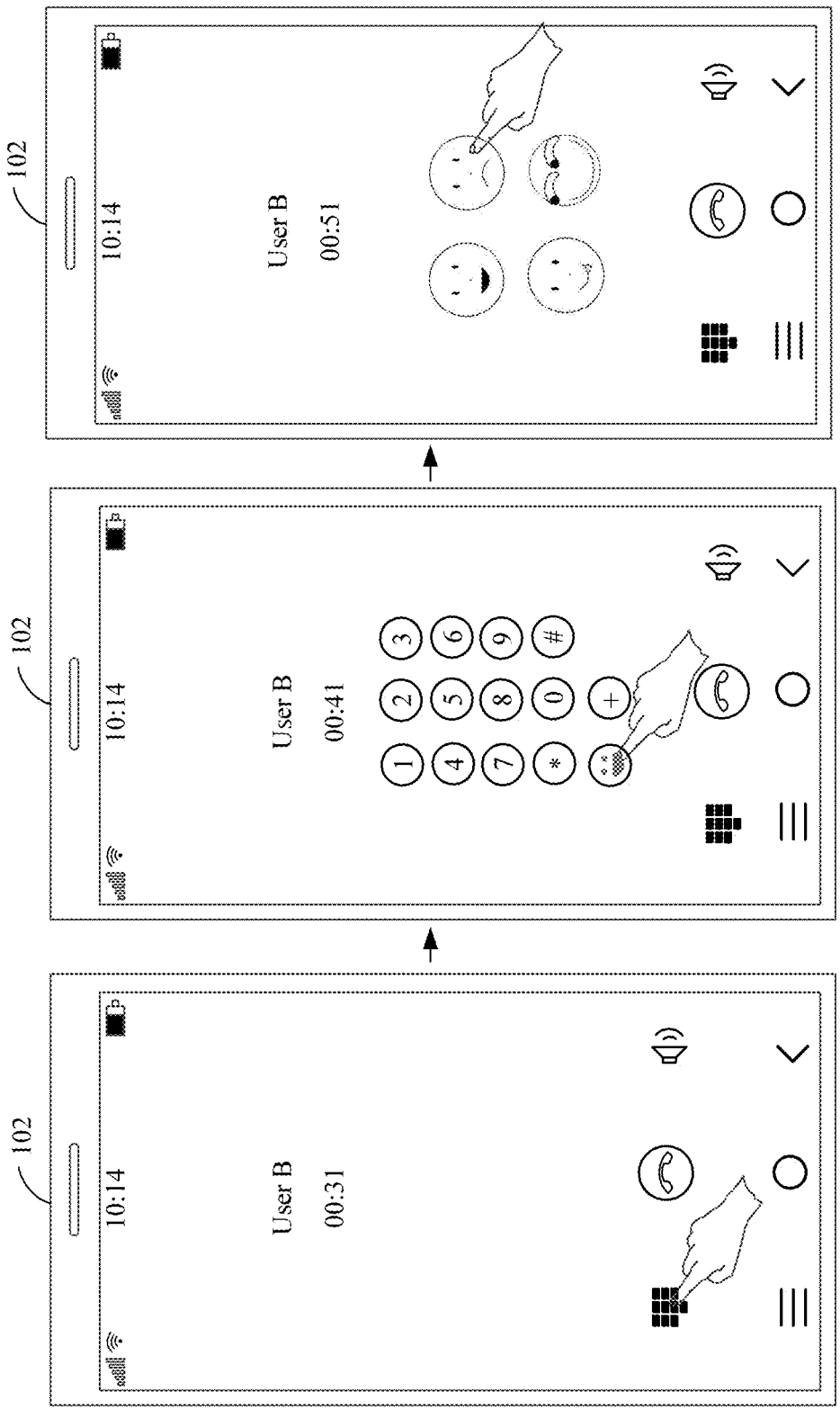
FIG. 6 and FIG. 7 are schematic diagrams of a call scenario according to an embodiment of this application.
Figure 7:
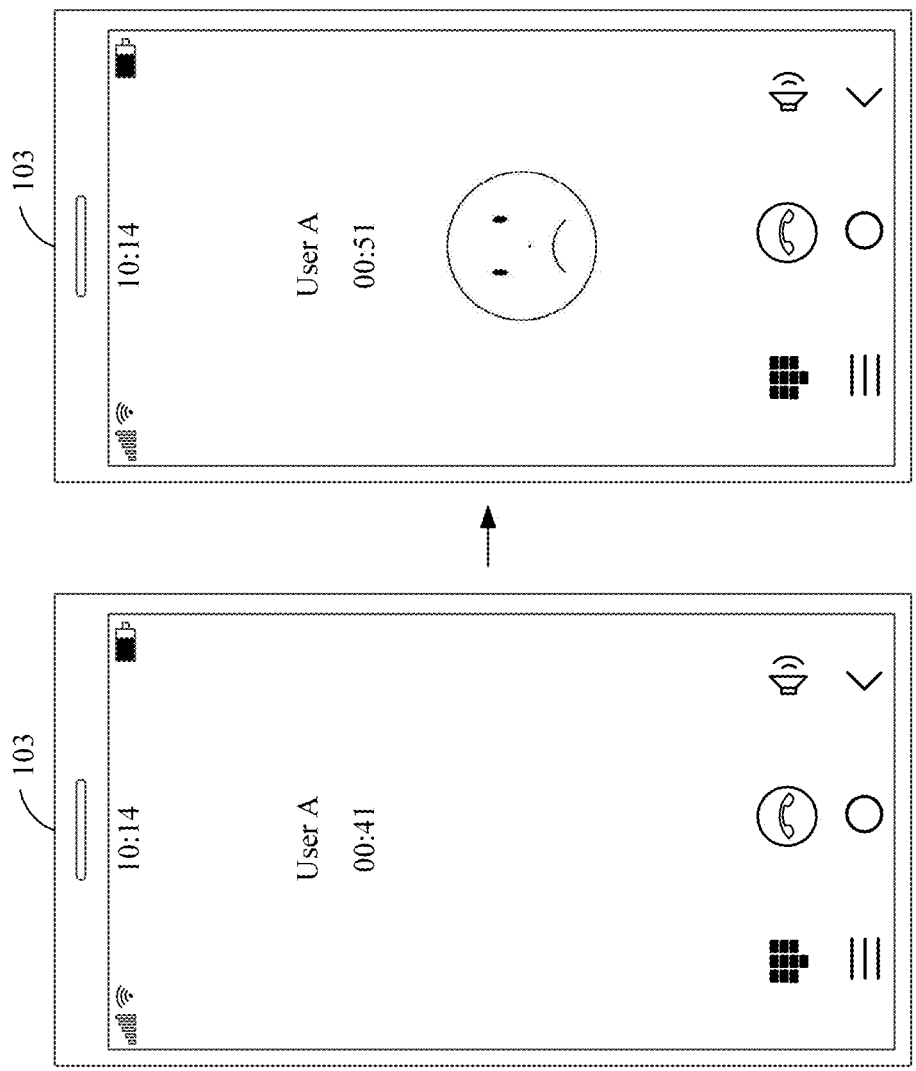

To better understand this embodiment of this application, FIG. 6 and FIG. 7 are a schematic diagram of a call scenario according to an embodiment of this application. In a feasible implementation of this application, it is assumed that a user of a first terminal 102 is a "user A", and a user of a second terminal 103 is a "user B". In this case, after a call connection is established between the first terminal 102 and the second terminal 103, if the user A wants to send an emoticon "sad" to the user B in a call process, the user A may first enable a keyboard on a call interface, and then tap an emotion input icon in the keyboard. In this case, a plurality of different emoticons are displayed on the call interface of the first terminal 102.

When the first terminal 102 detects that the user A taps the emoticon "sad", the first terminal 102 searches a corresponding first rich media library for a code corresponding to the emoticon "sad". For example, when finding that the code corresponding to the emoticon "sad" is "12", the first terminal encapsulates the code "12" into an RTCP packet, and sends the RTCP packet to the second terminal 103.

After receiving the RTCP packet sent by the first terminal 102, the second terminal 103 parses the RTCP packet to obtain the code "12" in the RTCP packets, and then searches a second rich media library corresponding to the second terminal 103 for rich media information corresponding to the code "12". The code "12" corresponds to the emoticon "sad" in the second rich media library corresponding to the second terminal 103, and therefore the second terminal 103 displays the emoticon "sad" on a current call interface. Details may be shown in FIG. 7.

It may be understood that rich media information such as an emoticon is sent in a call process, so that there are increasingly diversified and personalized manners of expression for the user in the call process, to greatly enrich fun in a call and better assist the user in fully expressing an emotion. In addition, the code corresponding to the rich media information is transmitted between the first terminal and the second terminal by using the RTCP packet as a carrier. In this way, bandwidth load of a channel for transmitting the voice stream or the video stream is not increased, and no loss is caused to voice stream data, to ensure good voice call experience.

Figure 8:
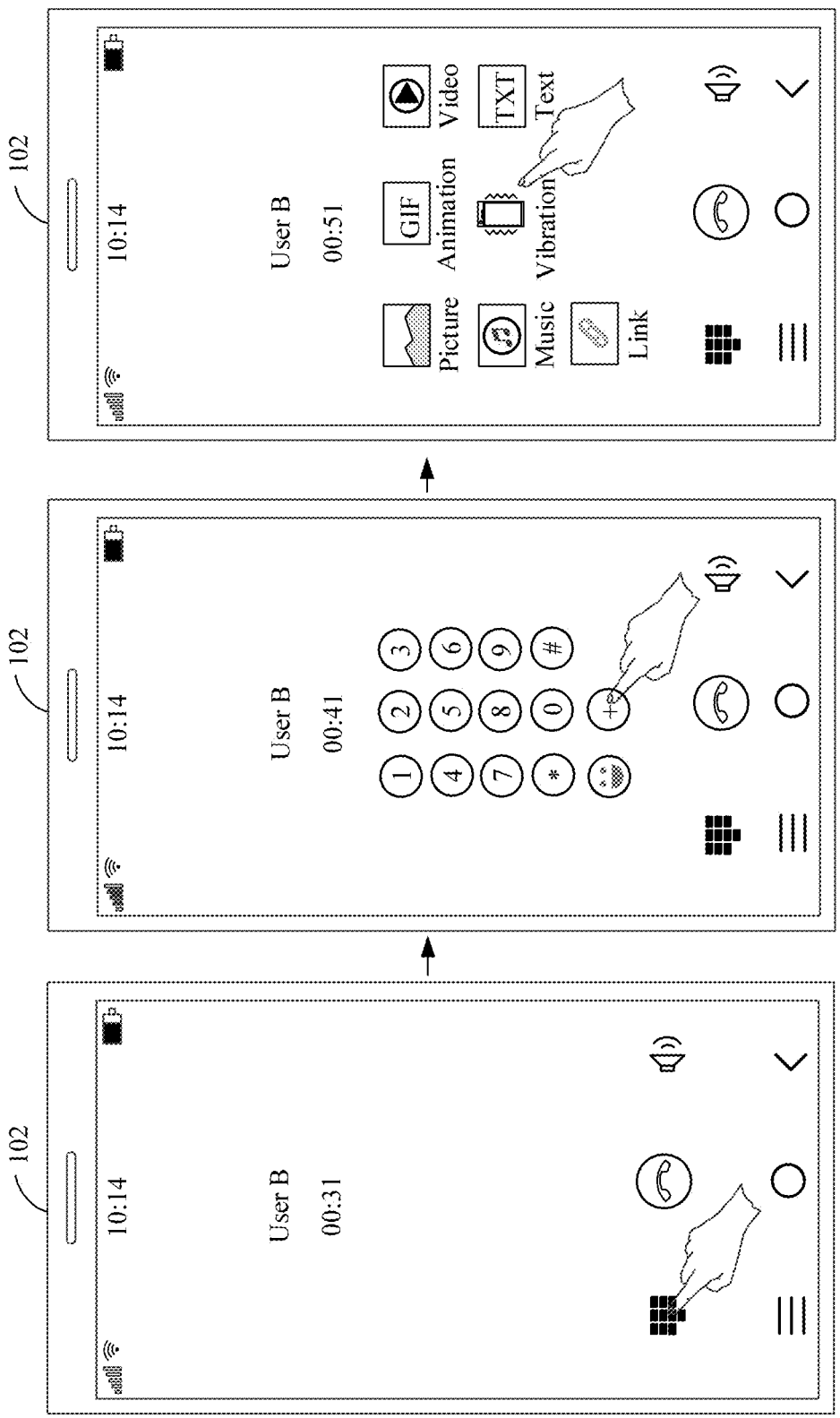
FIG. 8 and FIG. 9 are schematic diagrams of another call scenario according to an embodiment of this application.
Figure 9:
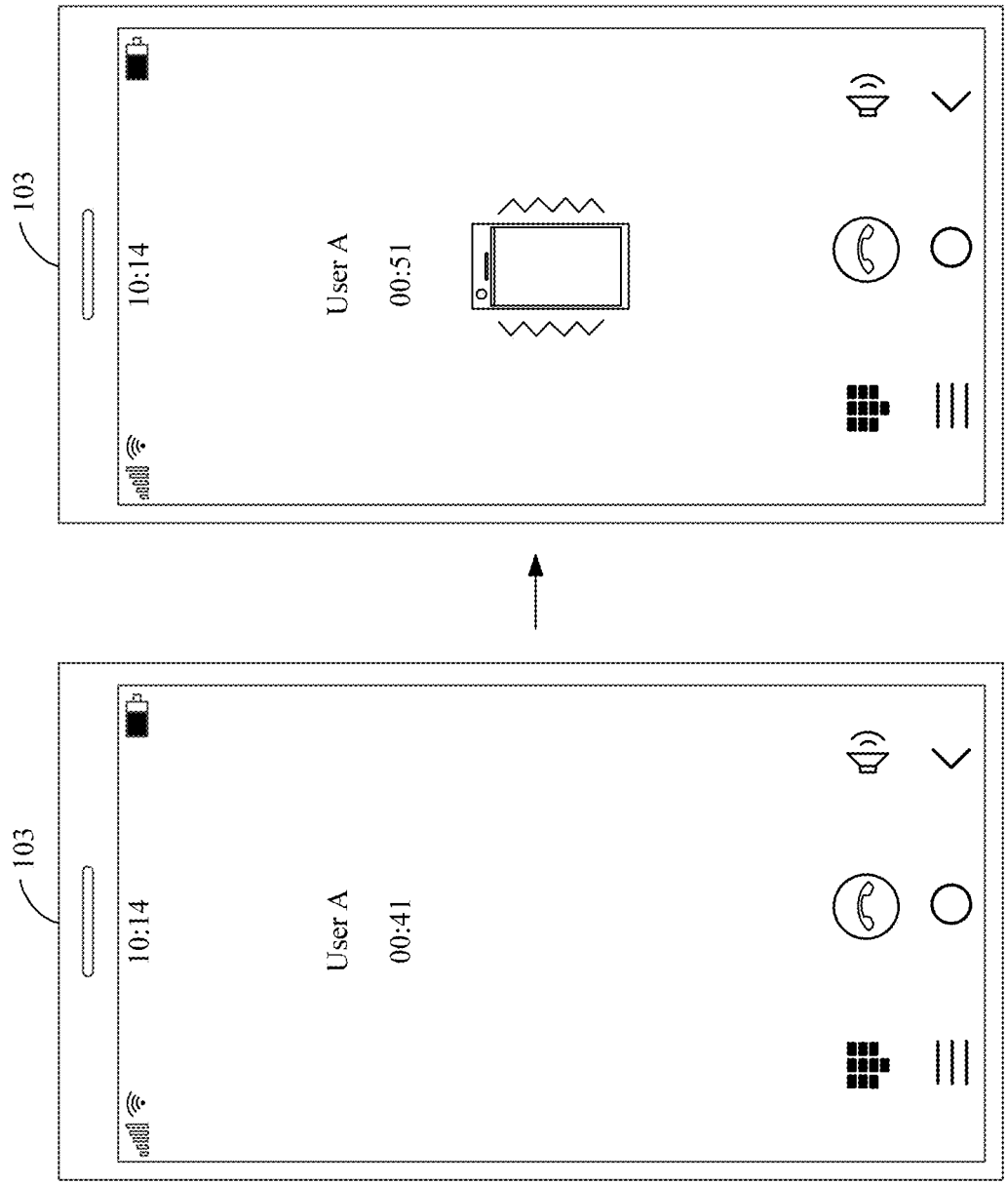

FIG. 8 and FIG. 9 are a schematic diagram of another call scenario according to an embodiment of this application. In another feasible implementation of this application, after a call connection is established between a first terminal 102 and a second terminal 103, if a user A wants to remind a user B in a call process, the user A may first enable a keyboard on a call interface, and then tap an input icon "+" in the keyboard. In this case, a plurality of different input options are displayed on the call interface of the first terminal 102.

When the first terminal 102 detects that the user A taps a "vibration" icon, the first terminal 102 searches a corresponding first rich media library for a code corresponding to the vibration event. For example, when finding that the code corresponding to the vibration event is "81", the first terminal encapsulates the code "81" into an RTCP packet, and sends the RTCP packet to the second terminal 103.

After receiving the RTCP packet sent by the first terminal 102, the second terminal 103 parses the RTCP packet to obtain the code "81" in the RTCP packet, and then searches a rich media library corresponding to the second terminal 103 for rich media information corresponding to the code "81". The code "81" corresponds to the vibration event in the rich media library corresponding to the second terminal 103, and therefore the second terminal 103 displays the "vibration" icon on a current call interface, and triggers a vibration function. Details may be shown in FIG. 9.

It may be understood that rich media information such as an emoticon is sent in a call process, so that there are increasingly diversified and personalized manners of expression for the user in the call process, to greatly enrich fun in a call and better assist the user in fully expressing an emotion. In addition, the code corresponding to the rich media information is transmitted between the first terminal and the second terminal by using the RTCP packet as a carrier. In this way, bandwidth load of a channel for transmitting the voice stream or the video stream is not increased, and no loss is caused to voice stream data, to ensure good voice call experience.

Based on the content described in the foregoing embodiment, in a feasible implementation of this application, after the call connection is established between the first terminal and the second terminal by using the RTP data link, if receiving a user operation of enabling key input, the first terminal displays an input keyboard on the call interface of the first terminal; detects a first code entered by the user in the input keyboard; and then determines whether there is the first code in the first rich media library, and if there is the first code in the first rich media library, determines rich media information corresponding to the first code in the first rich media library as the target rich media information. Then, the first terminal searches the first rich media library for the code corresponding to the target rich media information, encapsulates the code corresponding to the target rich media information into the RTCP packet, and sends the RTCP packet to the second terminal.

After receiving the RTCP packet sent by the first terminal, the second terminal parses the received RTCP packet to obtain the code in the RTCP packet, searches the second rich media library for the rich media information corresponding to the code in the RTCP packet, and responds to the found rich media information.

Figure 10:
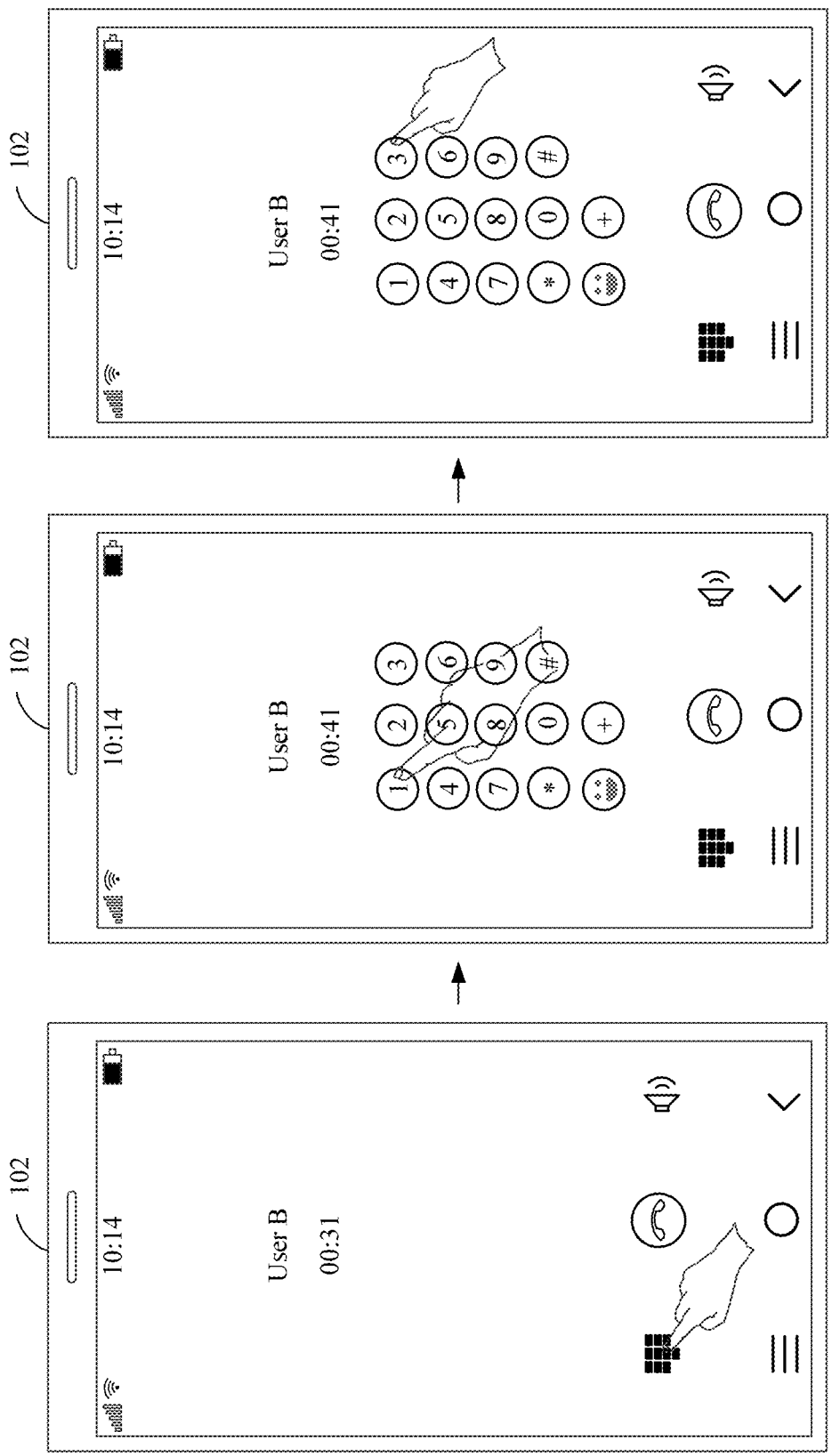
FIG. 10 and FIG. 11 are schematic diagrams of still another call scenario according to an embodiment of this application.
Figure 11:
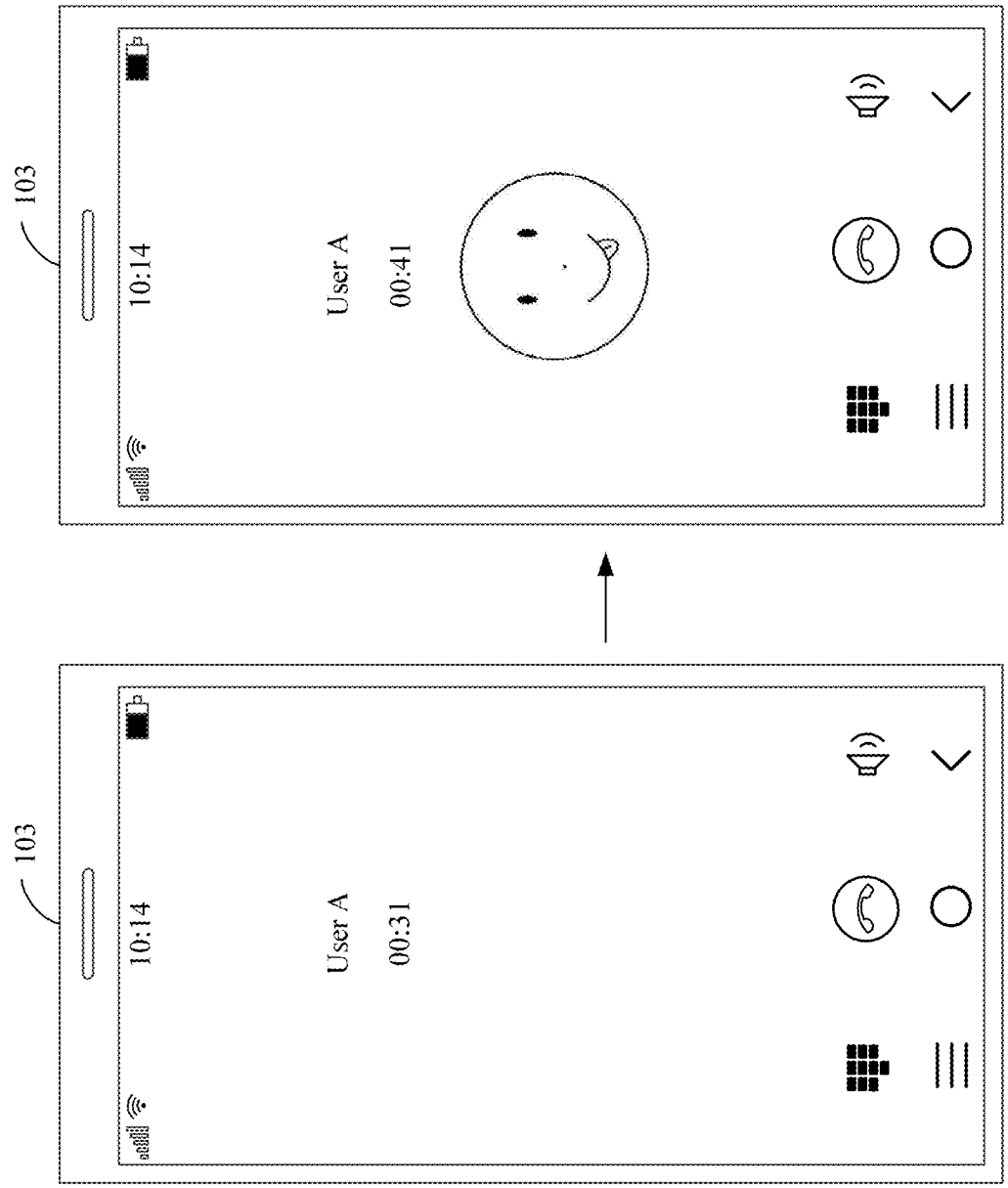

To better understand this embodiment of this application, FIG. 10 and FIG. 11 are a schematic diagram of still another call scenario according to an embodiment of this application. In still another feasible implementation of this application, after a call connection is established between a first terminal 102 and a second terminal 103, if a user A wants to send an emoticon "naughty" to a user B in a call process, the user A may enable a keyboard on a call interface, and then tap the keyboard to enter a code corresponding to the emoticon "naughty". For example, if the code corresponding to the emoticon "naughty" is "13", a group of keys corresponding to the emoticon is keys "1" and "3" on the first terminal 103.

When detecting that the keys "1" and "3" in the keyboard are continuously triggered by the user, the first terminal 102 determines whether there is the code "13" in the first rich media library, and if there is the code "13" in the first rich media library, encapsulates the code "13" into an RTCP packet, and sends the RTCP packet to the second terminal 103.

After receiving the RTCP packet sent by the first terminal 102, the second terminal 103 parses the RTCP packet to obtain the code "13" in the RTCP packet, and then searches a second rich media library corresponding to the second terminal 103 for rich media information corresponding to the code "13". The code "13" corresponds to the emoticon "naughty" in the second rich media library corresponding to the second terminal 103, and therefore the second terminal 103 displays the emoticon "naughty" on a current call interface. Details may be shown in FIG. 11.

It may be understood that in the manner of performing input by using a key, the user can quickly select to-be-sent rich media information in a call process, to enrich fun in a call and better assist the user in fully expressing an emotion.

Further, based on the content described in the foregoing embodiment, an embodiment of this application further provides an apparatus for transmitting rich media information in a call process. The apparatus is applied to a first terminal, and includes:
 a communications module, configured to establish a call connection to a second terminal by using an RTP data link;
 a sensing module, configured to determine, based on a user operation, target rich media information selected by a user in the first terminal;
 a searching module, configured to search a first rich media library for a code corresponding to the target rich media information; and
 a processing module, configured to: encapsulate the found code corresponding to the target rich media information into an RTCP packet, and send an RTCP packet obtained after encapsulation to the second terminal. Same rich media information corresponds to a same code in the first rich media library and a second rich media library corresponding to the second terminal.

According to the apparatus for transmitting rich media information in a call process provided in this embodiment of this application, after the call connection is established between the first terminal and the second terminal by using the RTP data link, a voice stream or a video stream is transmitted by using the RTP data link. The RTCP packet is originally used to carry channel quality information of an RTP data link of the first terminal, and does not affect the voice stream or the video stream transmitted in the RTP data link. Therefore, in the manner of encapsulating the code corresponding to the rich media information into the RTCP packet and transmitting the code by using the RTCP packet as a carrier, a case in which when the call terminal transmits the code corresponding to the rich media information, a loss is caused to the voice stream or the video stream that is being transmitted may be effectively avoided. In this way, fun in a call process can be enriched, and no impact is exerted on voice call experience.

It should be noted that for specific content executed by the communications module, the sensing module, the searching module, and the processing module, refer to related content in the method for transmitting rich media information in a call process described in the foregoing embodiment. Details are not described herein.

Further, based on the content described in the foregoing embodiment, an embodiment of this application further provides an apparatus for transmitting rich media information in a call process. The apparatus is applied to a second terminal, and includes:
 a communications module, configured to establish a call connection to a first terminal by using an RTP data link;
 a parsing module, configured to parse an RTCP packet when receiving the RTCP packet sent by the first terminal, to obtain a code in the RTCP packet; and
 a processing module, configured to: search a second rich media library for rich media information corresponding to the code, and respond to the found rich media information. Same rich media information corresponds to a same code in a first rich media library corresponding to the first terminal and the second rich media library.

According to the apparatus for transmitting rich media information in a call process provided in this embodiment of this application, after the call connection is established between the first terminal and the second terminal by using the RTP data link, the second terminal receives, by using the RTCP packet as a carrier, the code corresponding to the rich media information sent by the first terminal, to avoid a case in which a loss is caused to a voice stream or a video stream that is being transmitted. In this way, fun in a call process can be enriched, and no impact is exerted on voice call experience.

It should be noted that for specific content executed by the communications module, the parsing module, and the processing module, refer to related content in the method for transmitting rich media information in a call process described in the foregoing embodiment. Details are not described herein.

Further, based on the content described in the foregoing embodiment, an embodiment of this application further provides a terminal device. The terminal device includes at least one processor and a memory. The memory stores computer-executable instructions. The at least one processor executes the computer-executable instructions, to implement the steps performed by the first terminal in the foregoing embodiment. Details are not described herein in this embodiment of this application.

Further, based on the content described in the foregoing embodiment, an embodiment of this application further provides a terminal device. The terminal device includes at least one processor and a memory. The memory stores computer-executable instructions. The at least one processor executes the computer-executable instructions, to implement the steps performed by the second terminal in the foregoing embodiment. Details are not described herein in this embodiment of this application.

Further, based on the content described in the foregoing embodiment, an embodiment of this application further provides a computer-readable storage medium. The computer-readable storage medium stores computer-executable instructions. When a processor executes the computer-executable instructions, the steps performed by the first terminal or the second terminal in the foregoing embodiment may be implemented Further, based on the content described in the foregoing embodiment, an embodiment of this application further provides a computer program product, including a computer program. When the computer program is executed by a processor, the steps performed by the first terminal or the second terminal in the foregoing embodiment may be implemented.

In the several embodiments provided in this application, it should be understood that the disclosed device and method may be implemented in another manner. For example, the described device embodiments are merely examples. For example, the module division is merely logical function division, and there may be another division manner in actual implementation. For example, a plurality of modules may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical units, may be located at one position, or may be distributed on a plurality of network units. Some or all of the modules may be selected based on an actual requirement to achieve the objectives of the solutions in the embodiments.

In addition, functional modules in the embodiments of this application may be integrated into one processing unit, or each module may exist alone physically, or two or more modules are integrated into one unit. The unit formed by the modules may be implemented in a form of hardware or a form of hardware and a software functional unit.

The integrated module implemented in the form of a software functional module may be stored in a computer-readable storage medium. The software functional module is stored in a storage medium and includes several instructions for enabling a computer device (which may be a personal computer, a server, a network device, or the like) or a processor to perform some of the steps in the method in the embodiments of this application.

It should be understood that the processor may be a central processing unit (CPU), or may be another general-purpose processor, a digital signal processor (DSP), an application-specific integrated circuit (ASIC), or the like. The general-purpose processor may be a microprocessor, or the processor may be any conventional processor, or the like. The steps in the method disclosed with reference to this application may be directly performed by a hardware processor, or may be performed by a combination of hardware in a processor and a software module.

The memory may include a high-speed RAM memory, or may include a nonvolatile memory NVM, for example, at least one disk memory, or may be a USB flash drive, a removable hard disk, a read-only memory, a magnetic disk, an optical disc, or the like.

The bus may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this application is not limited to only one bus or only one type of bus.

The storage medium may be implemented by any type of volatile or nonvolatile storage device or a combination thereof, for example, a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disc. The storage medium may be any available medium that can be accessed by a general-purpose or dedicated computer.

An example storage medium is coupled to a processor, to enable the processor to read information from and write information to the storage medium. Certainly, the storage medium may be a part of a processor. The processor and the storage medium may be located in an application-specific integrated circuit (ASIC). Certainly, the processor and the storage medium may exist as discrete components in an electronic device or a main control device.

A person of ordinary skill in the art may understand that all or some of the steps in the method embodiments may be implemented by instructing a related device by a program. The program may be stored in a computer-readable storage medium. When the program is executed, the steps in the method embodiments are performed. The storage medium includes any medium that can store program code, for example, a ROM, a RAM, a magnetic disk, or an optical disc.

Finally, it should be noted that the foregoing embodiments are merely intended to describe the technical solutions of this application, and are not intended to limit this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of this application.

What is claimed is:

1. A method for transmitting rich media information in a call process, the method comprising:

establishing, by a first terminal, a call connection to a second terminal by using a real-time transport protocol (RTP) data link;

determining, by the first terminal based on a user operation, target rich media information selected by a user in the first terminal;

searching, by the first terminal, a first rich media library for a code corresponding to the target rich media information, wherein the first rich media library corresponds to the first terminal;

encapsulating, by the first terminal, the code found in the first rich media library corresponding to the target rich media information into a real-time transport control protocol (RTCP) packet; and sending, by the first terminal, the RTCP packet obtained after encapsulating to the second terminal, wherein same rich media information corresponds to a same code in the first rich media library corresponding to the first terminal and a second rich media library corresponding to the second terminal.

2. The method according to claim 1, wherein the determining the target rich media information comprises:

displaying, by the first terminal, at least one piece of rich media information in the first rich media library on a call interface of the first terminal based on receiving a user operation of expanding a rich media information directory; and receiving, by the first terminal, a selection operation, and determining rich media information selected based on the selection operation in the first rich media library as the target rich media information.

3. The method according to claim 1, wherein the determining the target rich media information comprises:

displaying, by the first terminal, an input keyboard on a call interface of the first terminal based on receiving a user operation of enabling key input;

detecting, by the first terminal, a first code entered by the user in the input keyboard; and determining, by the first terminal, whether there is the first code in the first rich media library, and based on the first code being in the first rich media library, determining rich media information corresponding to the first code in the first rich media library as the target rich media information.

4. The method according to claim 1, wherein the encapsulating, by the first terminal, the code found in the first rich media library corresponding to the target rich media information into the RTCP packet comprises:

encapsulating, by the first terminal, the code corresponding to the target rich media information into a source description packet (SDES) field in the RTCP packet.

5. The method according to claim 4, wherein the encapsulating, by the first terminal, the code in the SDES field in the RTCP packet comprises:

configuring, by the first terminal, a value string in the SDES field as the code corresponding to the target rich media information.

6. The method according to claim 1, wherein the target rich media information comprises any one of the following: an emoticon, a picture, an animation, a video, text, music, a link, or a vibration event.

7. A method for transmitting rich media information in a call process, comprising:

establishing, by a second terminal, a call connection to a first terminal by using a real-time transport protocol (RTP) data link;

parsing, by the second terminal, a real-time transport control protocol (RTCP) packet based on receiving the RTCP packet from the first terminal, to obtain a code in the RTCP packet; and searching, by the second terminal, a second rich media library corresponding to the second terminal for rich media information corresponding to the code, and responding to the rich media information, wherein same rich media information corresponds to a same code in a first rich media library corresponding to the first terminal and the second rich media library corresponding to the second terminal.

8. The method according to claim 7, wherein the parsing the RTCP packet comprises:

parsing, by the second terminal, a source description packet (SDES) field in the RTCP packet based on receiving the RTCP packet from the first terminal, to obtain the code in the RTCP packet.

9. The method according to claim 8, wherein the parsing the RTCP packet comprises:

parsing the SDES field in the RTCP packet, and using a value string in the SDES field as the code in the RTCP packet.

10. The method according to claim 7, wherein the searching, by the second terminal, the second rich media library corresponding to the second terminal for rich media information corresponding to the code, and responding to the rich media information comprises:

based on the second rich media library not comprising the code in the RTCP packet and/or the rich media information corresponding to the code in the RTCP packet, obtaining, by the second terminal, the rich media information corresponding to the code in the RTCP packet from the first terminal or a server connected to the second terminal, and responding to the rich media information obtained from the first terminal or the server.

11. The method according to claim 10, wherein after the obtaining, by the second terminal, the rich media information corresponding to the code in the RTCP packet from the first terminal or the server, the method further comprises:

updating, by the second terminal, the second rich media library based on the rich media information obtained from the first terminal or the server corresponding to the code in the RTCP packet.

12. The method according to claim 7, wherein the searching the second rich media library for the rich media information corresponding to the code in the RTCP packet, and responding to the rich media information comprises:

displaying or playing the rich media information on a call interface of the second terminal based on the rich media information being any one of an emoticon, a picture, an animation, a video, text, music, or a link; or triggering a vibration function of the second terminal based on the found rich media information being a vibration event.

13. A first terminal, comprising:

at least one processor; and a memory, wherein the memory stores computer-executable instructions, and wherein the at least one processor executes the computer-executable instructions stored in the memory to cause the first terminal to perform:

establishing a call connection to a second terminal by using a real-time transport protocol (RTP) data link;

determining, based on a user operation, target rich media information selected by a user in the first terminal;

searching a first rich media library for a code corresponding to the target rich media information, wherein the first rich media library corresponds to the first terminal;

encapsulating the code found in the first rich media library corresponding to the target rich media information into a real-time transport control protocol (RTCP) packet; and sending the RTCP packet obtained after encapsulating to the second terminal, wherein same rich media information corresponds to a same code in the first rich media library corresponding to the first terminal and a second rich media library corresponding to the second terminal.

14. The first terminal according to claim 13, wherein the determining the target rich media information comprises:

displaying, by the first terminal, at least one piece of rich media information in the first rich media library on a call interface of the first terminal based on receiving a user operation of expanding a rich media information directory; and receiving, by the first terminal, a selection operation, and determining rich media information selected based on the selection operation in the first rich media library as the target rich media information.

15. The first terminal according to claim 13, wherein the determining the target rich media information comprises:

displaying, by the first terminal, an input keyboard on a call interface of the first terminal based on receiving a user operation of enabling key input;

detecting, by the first terminal, a first code entered by the user in the input keyboard; and determining, by the first terminal, whether there is the first code in the first rich media library, and based on the first code being in the first rich media library, determining rich media information corresponding to the first code in the first rich media library as the target rich media information.

16. The first terminal according to claim 13, wherein the encapsulating the code into the RTCP packet comprises:

encapsulating, by the first terminal, the code corresponding to the target rich media information into a source description packet (SDES) field in the RTCP packet.

17. The first terminal according to claim 16, wherein the encapsulating the code in the SDES field in the RTCP packet comprises:

configuring, by the first terminal, a value string in the SDES field as the code corresponding to the target rich media information.

18. The first terminal according to claim 13, wherein the target rich media information comprises any one of the following: an emoticon, a picture, an animation, a video, text, music, a link, or a vibration event.

* * * * *